United States Patent
Sokolchik et al.

(10) Patent No.: US 8,365,924 B2
(45) Date of Patent: Feb. 5, 2013

(54) SYSTEMS AND METHODS FOR FILTERING FUEL

(75) Inventors: Igor Sokolchik, West Lafayette, IN (US); Matthew Ronald Hulen, West Lafayette, IN (US); Rhett Dakota Ringenberger, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 671 days.

(21) Appl. No.: 12/221,829

(22) Filed: Aug. 7, 2008

(65) Prior Publication Data

US 2010/0031615 A1 Feb. 11, 2010

(51) Int. Cl.
*B01D 29/00* (2006.01)
*B01D 35/28* (2006.01)

(52) U.S. Cl. ............... 210/416.4; 210/252; 210/253; 210/323.1; 210/335; 210/340; 210/436; 210/444

(58) Field of Classification Search ............... 210/323.1, 210/335, 340, 252, 253, 258
See application file for complete search history.

(56) References Cited

U.S. PATENT DOCUMENTS

| | | | |
|---|---|---|---|
| 4,192,750 A * | 3/1980 | Elfes et al. | 210/133 |
| 4,334,995 A | 6/1982 | Mahon | |
| 4,552,662 A | 11/1985 | Webster et al. | |
| 4,904,382 A * | 2/1990 | Thomsen | 210/236 |
| 5,355,860 A | 10/1994 | Ekstam | |
| 5,372,115 A | 12/1994 | Straub et al. | |
| 5,407,571 A | 4/1995 | Rothwell | |
| 5,525,225 A * | 6/1996 | Janik et al. | 210/436 |
| 5,746,184 A | 5/1998 | Ekstam | |
| 6,159,383 A | 12/2000 | Gullett et al. | |
| 6,517,717 B1 | 2/2003 | Håkansson | |
| 6,571,836 B2 | 6/2003 | Ephraim et al. | |
| 6,991,725 B2 | 1/2006 | Frerichs et al. | |
| 7,294,262 B2 | 11/2007 | Tadlock | |
| 2003/0168402 A1 * | 9/2003 | McKay | 210/512.1 |
| 2004/0118764 A1 | 6/2004 | Miller et al. | |
| 2005/0045552 A1 * | 3/2005 | Tadlock | 210/440 |

* cited by examiner

*Primary Examiner* — Benjamin Kurtz
(74) *Attorney, Agent, or Firm* — Finnegan, Henderson, Farabow, Garrett & Dunner LLP

(57) ABSTRACT

The present disclosure is directed to a manifold for a filter assembly. The manifold includes a first base which may define a first inlet configured to direct fuel flow to a first filter element, and a first outlet configured to direct fuel flow from the first filter element to the second filter element. The manifold includes a second base operably coupled to the first base. The second base may define a barrier which prevents the fuel flow from flowing from the first inlet to the second filter element without passing through the first filter element. The second base may also define a second inlet configured to receive fuel flow from the first outlet and direct the fuel flow to the second filter element, and a second outlet configured to receive the fuel flow from the second filter element.

22 Claims, 3 Drawing Sheets

SYSTEMS AND METHODS FOR FILTERING FUEL

TECHNICAL FIELD

This disclosure relates generally to systems and methods for filtering fuel, and more particularly, to systems and methods for providing fuel filtration through modules receiving spin-on type fuel filters.

BACKGROUND

Engines, including compression-ignition engines, spark-ignition engines, gasoline engines, gaseous fuel-powered engines, and other internal combustion engines, may operate more effectively with fuel from which contaminates have been removed prior to the fuel reaching a combustion chamber of the engine. In particular, fuel contaminates, if not removed, may lead to undesirable operation of the engine and/or may increase the wear rate of engine components, such as, for example, fuel system components.

Effective removal of contaminates from the fuel system of a compression-ignition engine may be particularly important. In some compression-ignition engines, air is compressed in a combustion chamber, thereby increasing the temperature and pressure of the air, such that when fuel is supplied to the combustion chamber, the fuel and air ignite. If water and/or other contaminates are not removed from the fuel, the contaminates may interfere with and/or damage, for example, fuel injectors, which may have orifices manufactured to exacting tolerances and shapes for improving the efficiency of combustion and/or reducing undesirable exhaust emissions. Moreover, the presence of water in the fuel system may cause considerable engine damage and/or corrosion in the injection system.

Fuel filtration systems serve to remove contaminates from the fuel. For example, some conventional fuel systems may include a primary fuel filter, which removes water and large particulate matter, and a secondary fuel filter, which removes a significant portion of remaining (e.g., smaller) contaminates, such as fine particulate matter. In particular, a typical secondary filter may include multiple filter elements attached to a shared housing. The housing directs fuel flow through the filter elements and out to the fuel system. Multiple filter elements may be attached to the housing, such that a given volume of fuel is filtered by only one of the multiple filter elements. Thus, in a system including a primary filter and a secondary filter, a given volume of fuel is filtered via filtration media twice—once in the primary filter, where water and relatively large particulate matter may be removed, and once in the secondary filter, where relatively small particulate matter may be removed. In some systems, attempts to improve the effectiveness of filtration systems have resulted in providing additional, separate fuel filters arranged with a modified housing to supplement the primary and secondary fuel filters. The complex modification of the housing, however, may be undesirable due, for example, to the increased number of components, requiring repair and regular maintenance, and introduction of potential additional leak points.

One attempt to modify the housing which receives a fuel filter is described in U.S. Pat. No. 7,294,262 ("the '262 patent") issued to Tadlock on Nov. 13, 2007. Specifically, the '262 patent discloses a modular fluid treatment assembly and method in which modules of the system each have a head that can be connected to one or more heads (of one or more modules) in different configurations. The modules may have a head with substantially concentric inlet and outlet ports in fluid communication with a cartridge coupled to the head. Although the modular filter assembly described in the '262 patent may benefit from its capacity to connect one or more heads in different configurations, the '262 patent presents a system that includes a large number of parts, therefore providing additional complexity and potential leak points for fuel.

The present disclosure may be directed to overcoming or mitigating one or more of the potential problems set forth above.

SUMMARY

In one aspect, the present disclosure is directed to a manifold configured to direct fuel flow within a fuel filter assembly. The manifold may include a first base. The first base may define a first inlet configured to direct fuel flow to a first filter element, a first outlet configured to direct fuel flow from the first filter element to the second filter element, and a coupling configured to receive the first filter element. The manifold may further include a second base operably coupled to the first base. The second base may define a barrier configured to prevent the fuel flow from flowing from the first inlet to the second filter element without passing through the first filter element. The second base may also define a second inlet configured to receive fuel flow from the first outlet and direct the fuel flow to the second filter element, a second outlet configured to receive the fuel flow from the second filter element, and a coupling configured to receive the second filter element.

An additional aspect of the present disclosure is directed to a filter assembly, which may include a first filter element configured to filter fuel, a second filter element configured to filter fuel, and a manifold configured to direct fuel to the first and the second filter elements. The manifold may include a first base. The first base may define a first inlet configured to direct fuel flow to the first filter element, a first outlet configured to direct fuel flow from the first filter element to the second filter element, and a coupling receiving the first filter element. The manifold may further include a second base operably coupled to the first base. The second base may define a barrier configured to prevent the fuel flow from flowing from the first inlet to the second filter element without passing through the first filter element. The second base may further define a second inlet configured to receive fuel flow from the first outlet and direct the fuel flow to the second filter element, a second outlet configured to receive the fuel flow from the second filter element, and a coupling receiving the second filter element.

DETAILED DESCRIPTION

Figure 1:
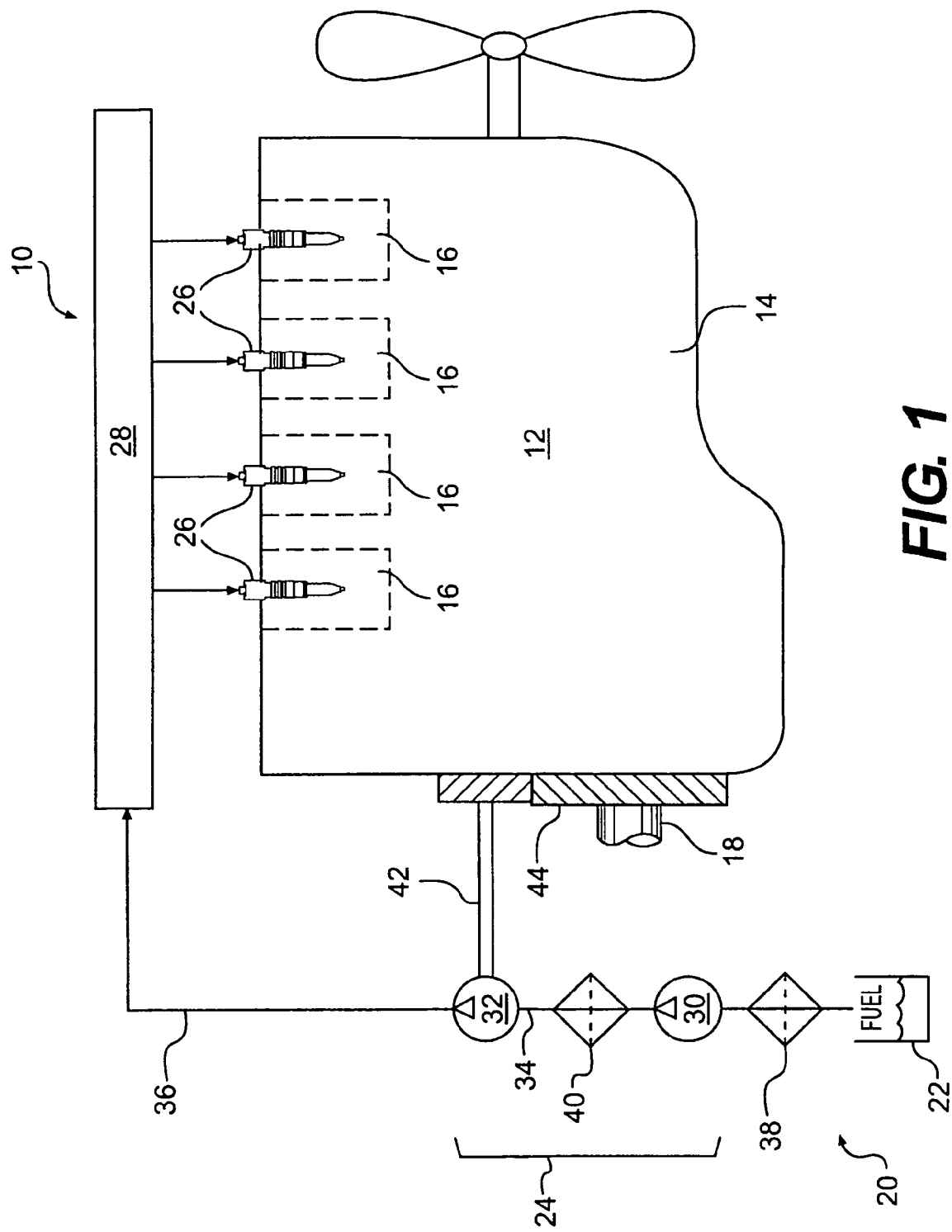
FIG. 1 is a schematic illustration of an exemplary embodiment of a power system.

FIG. 1 illustrates an exemplary embodiment of a power system 10 configured to convert fuel and air into mechanical work. Power system 10 includes an engine 12 (e.g., a four-stroke compression-ignition engine). One skilled in the art will recognize that engine 12 may be any type of internal combustion engine, such as, for example, a spark-ignition engine, a gasoline engine, or a gaseous fuel-powered engine. Engine 12 may include a block 14 that at least partially defines a plurality of combustion chambers 16. As shown in FIG. 1, exemplary engine 12 includes four combustion chambers 16. It is contemplated that engine 12 may include a greater or lesser number of combustion chambers 16, and that combustion chambers 16 may be disposed in any configuration, such as, for example, in an "in-line" configuration, a "V" configuration, or any other known configuration. Engine 12 may include a crankshaft 18 that is rotatably disposed within block 14. Connecting rods (not shown) may connect a plurality of pistons (not shown) to crankshaft 18, so that combustion within a combustion chamber 16 results in a sliding motion of each piston within a respective combustion chamber 16, which, in turn, results in rotation of crankshaft 18, as is conventional in a reciprocating-piston engine.

Power system 10 may include a fuel system 20 configured to deliver injections of pressurized fuel into each of combustion chambers 16 according to a timing scheme, resulting in coordinated combustion within combustion chambers 16. For example, fuel system 20 may be a common rail system and may include a tank 22 configured to hold a supply of fuel, and a fuel pumping arrangement 24 configured to flow and/or pressurize the fuel and direct the fuel to a plurality of fuel injectors 26 associated with combustion chambers 16 via a flow path 28 (e.g., a fuel rail).

For example, pumping arrangement 24 may include one or more pumping devices configured to increase the pressure of the fuel and direct one or more pressurized streams of fuel to flow path 28. According to some embodiments, pumping arrangement 24 may include a low pressure pump 30 and a high pressure pump 32 disposed in series and fluidly connected by way of a fuel line 34. Low pressure pump 30 may include a transfer pump that provides a low pressure fuel feed to high pressure pump 32. High pressure pump 32 may receive a low pressure fuel feed and increase the pressure of the fuel up to as much as, for example, 300 MPa. High pressure pump 32 may be operably coupled to flow path 28 via a fuel line 36.

According to the exemplary embodiment shown in FIG. 1, low pressure pump 30 and/or high pressure pump 32 may be operably coupled to engine 12 and may be driven, for example, via crankshaft 18, either directly or indirectly. For example, low pressure pump 30 and/or high pressure pump 32 may be operably coupled to crankshaft 18 in any manner known to those skilled in the art, such that rotation of crankshaft 18 will result in a corresponding driving rotation of low pressure pump 30 and/or high pressure pump 32. For example, a driveshaft 42 of high pressure pump 32 is shown in FIG. 1 as being operably coupled to crankshaft 18 via a gear train 44. It is contemplated, however, that low pressure pump 30 and/or high pressure pump 32 may alternatively be driven electrically, hydraulically, pneumatically, or in any other known manner. It is further contemplated that fuel system 20 may also include, for example, a mechanical fuel injector system and/or a hydraulic fuel injector system, where the pressure of the injected fuel is generated and/or enhanced within individual injectors, with or without the use of a high pressure source.

According to some embodiments, one or more filtering assemblies, such as, for example, a primary filter assembly 38 and/or a secondary filter assembly 40, may be disposed along fuel line 34 (e.g., in a series relationship, as shown), and may be configured to remove contaminates, such as water and/or particulate matter from the fuel. For example, primary filter assembly 38 may include a filter element (not shown) configured to remove water and/or relatively large particulate matter from fuel received from tank 22. According to some embodiments, secondary filter assembly 40 may include one or more filter elements configured to remove particulate matter from fuel that has not been removed via primary filter assembly 38 (e.g., relatively smaller particulate matter), as described in more detail below. For example, primary filter assembly 38 may include a filter media configured to remove non-fuel liquid (e.g., water) and/or about 10 micron-size and larger particles, and secondary filter assembly 40 may include a filter media configured to remove about 3 micron-size and larger particles.

Figure 2:
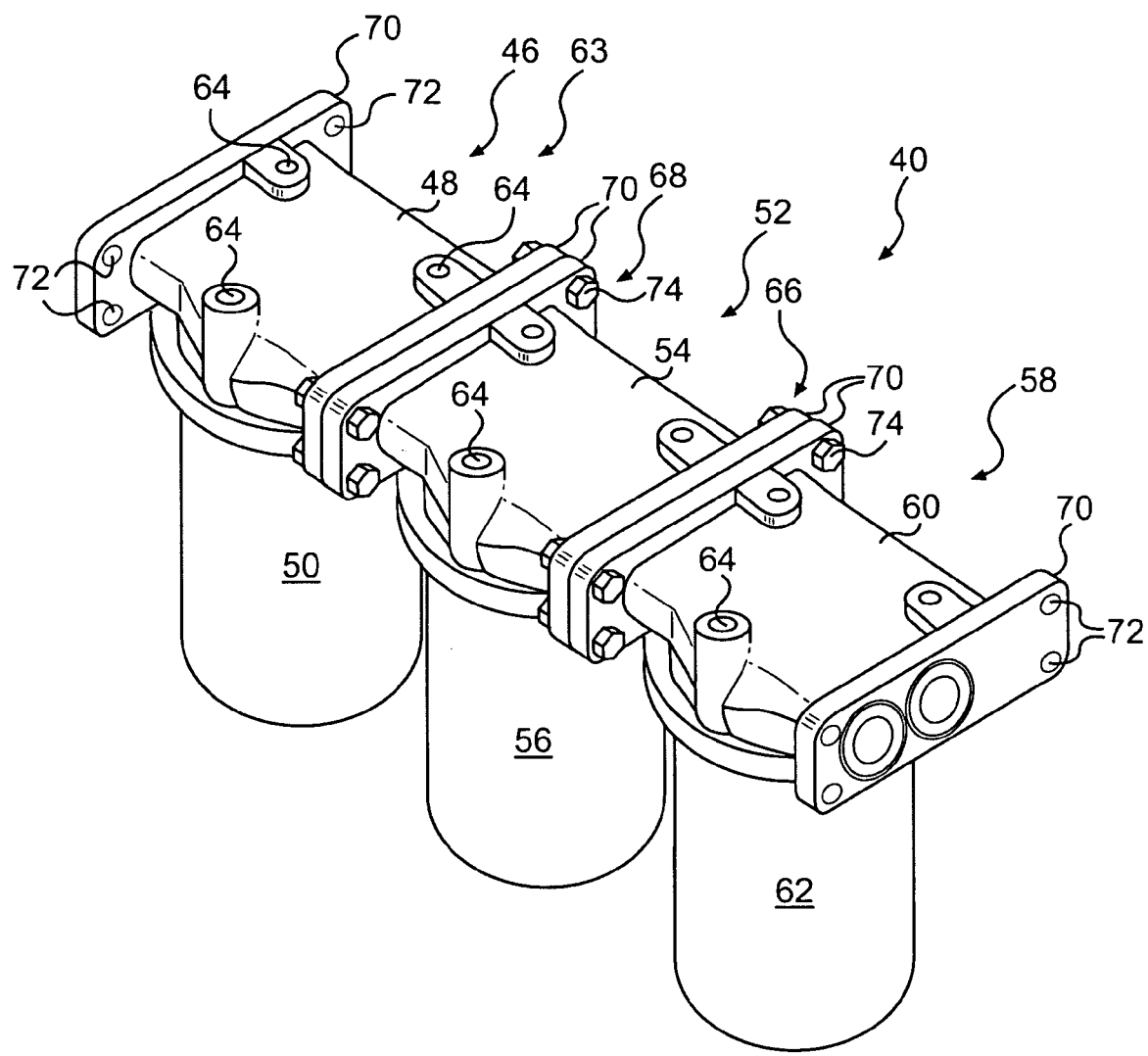
FIG. 2 is a schematic, perspective view of an exemplary embodiment of a fuel filter assembly.

According to the exemplary embodiment shown in FIG. 2, secondary filter assembly 40 may include, for example, one or more filter modules. Each of the filter modules may include a filter base and a filter element. For example, the exemplary embodiment of secondary filter assembly 40 shown in FIG. 2 includes a first filter module 46, including a first filter base 48 and a first filter element 50, a second filter module 52, including a second filter base 54 and a second filter element 56, and a third filter module 58, including a third filter base 60 and a third filter element 62. One or more of the filter bases 48, 54, and 60 defines a manifold 63 for secondary filter assembly 40. Filter elements 50, 56, and 62 may be operably coupled to respective filter bases 48, 54, and 60 in any manner known to those skilled in the art, such as, for example via a threaded coupling. For example, one or more filter elements 50, 56, and 62 may be spin-on type fuel filters. According to the exemplary embodiment shown in FIG. 2, one or more of filter elements 50, 56, and 62 may include a semi-permeable filter media (not shown) configured to prevent particulate matter of relatively smaller particulate size from passing through secondary filter assembly 40 to fuel injectors 26 (see FIG. 1). As shown in FIG. 2, exemplary secondary filter assembly 40 includes three modules 46, 52, and 58. It is contemplated that secondary filter assembly 40 may be configured to include a greater or lesser number of modules, and thereby receive a greater or lesser number of filter elements.

One or more of modules 46, 52, and 58 may be mounted to the engine, for example, via a support structure (not shown). The support structure may include any known configuration apparent to those skilled in the art. According to some embodiments, modules 46, 52, and 58 may be configured to be removable from the support structure, thereby permitting replacement or repair. As shown in FIG. 2, secondary filter assembly 40 may include one or more bosses 64 configured to mount secondary filter assembly 40 to engine 12 or to other parts associated with the engine 12.

As shown in the exemplary embodiment, modules 46, 52, and 58 may define similar exterior construction, and may be operably coupled to adjacent modules. For example, filter bases 48, 54, and 60 may define a proximal end 66 and a distal end 68 configured to receive adjacent modules. According to the exemplary embodiment shown in FIG. 2, filter bases 48, 54, and 60 may include a flange 70 at both the proximal end 66 and distal end 68 and may be provided with one or more openings 72, configured to receive a fastener 74, such as, for example, a bolt and/or a nut.

Figure 3:
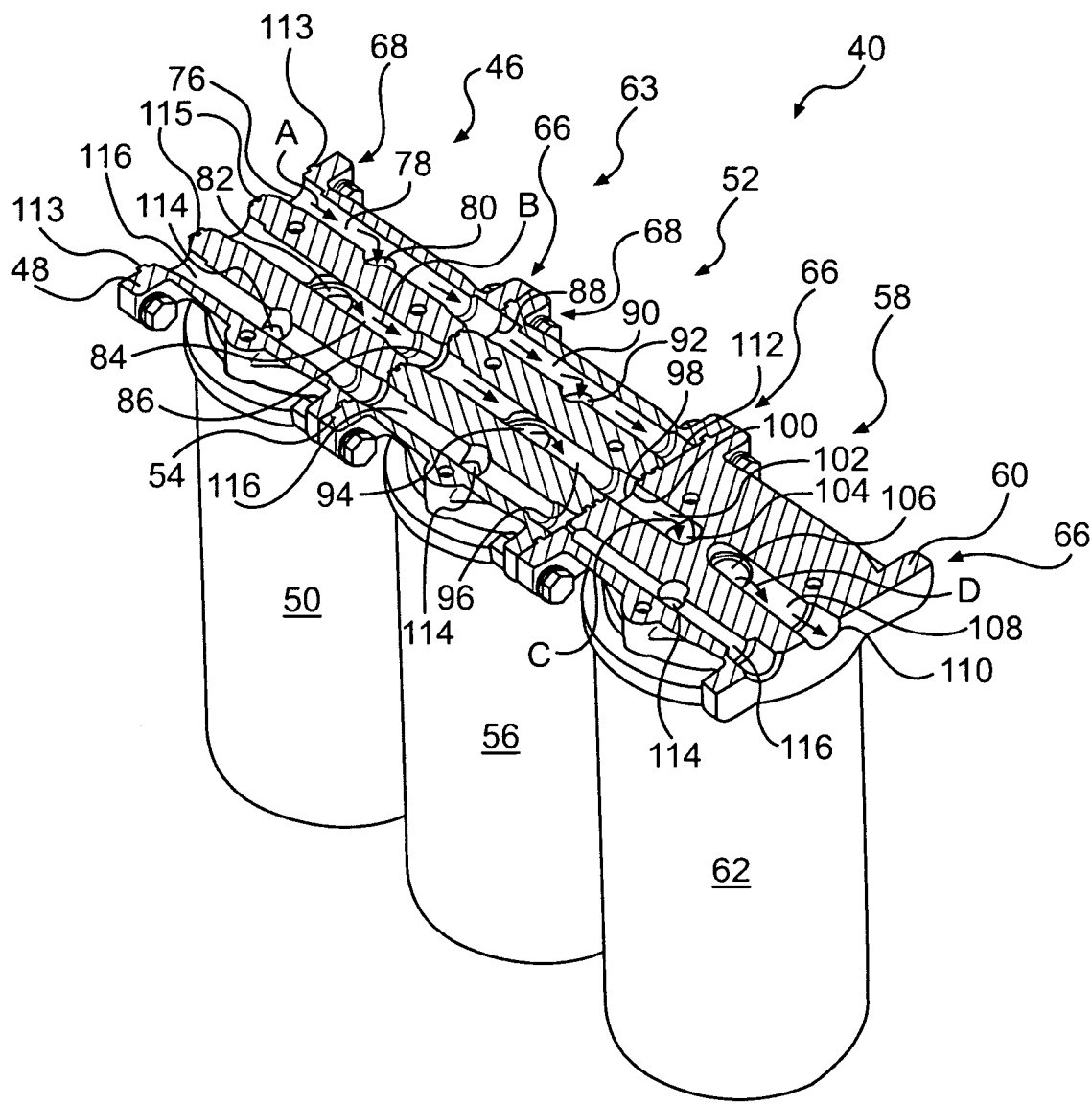
FIG. 3 is a schematic, partial cross-section view of the exemplary embodiment shown in FIG. 2.

As shown in FIG. 3, filter bases 48, 54, and 60 may include a number of passages configured to direct the fuel flow through secondary filter assembly 40. For example, filter bases 48, 54, and 60 may be configured to direct the flow of fuel into and from two or more filter elements in a parallel manner (i.e., such that a given volume of fuel is filtered via a single filter element), or in a series manner (i.e., such that fuel is filtered via more than one filter element prior to flowing out of secondary filter assembly 40). According to the exemplary embodiment shown in FIG. 3, filter bases 48, 54, and 60 may differ in internal arrangement and may be configured to direct fuel flow through filter elements 50, 56, and 62 in a parallel or series flow arrangement. In a combined parallel and series flow arrangement, for example, as shown in FIG. 3, first and second filter modules 46 and 52 may be configured to direct flow in a parallel arrangement to third filter module 58, such that a given volume of fuel received from fuel line 34 may be filtered by first filter element 50 or second filter element 56, and is then directed through third filter element 62 prior to flowing out of secondary filter assembly 40. For example, first filter base 48 may be configured to direct fuel flow received from fuel line 34 (see FIG. 1) through first filter element 50, and output filtered fuel directly to third filter base 60 without passing through filter element 56. Second filter base 54 may be configured to direct fuel flow received from fuel line 34 (see FIG. 1) through second filter element 56, and output filtered fuel directly to third filter base 60. Third filter base 60 may be configured to receive filtered fuel from first and second filter elements 50 and 56, direct the filtered fuel through third filter element 62, and output the twice-filtered fuel to fuel line 36 and/or into high pressure pump 32 (see FIG. 1).

In the exemplary embodiment shown in FIG. 3, first filter base 48 may define an inlet 76, an inlet passage 78, a filter element inlet 80, a filter element outlet 82, an outlet passage 84, and an outlet 86. Distal end 68 of first filter base 48 may define an inlet 76 configured to receive fuel line 34 (see FIG. 1) via a connection, such as, for example, a threaded fastener, press fit connection, or any other connection known in the art. Inlet passage 78 may be adjacent to inlet 76, and may define a channel that connects inlet 76 and filter element inlet 80. Filter element inlet 80 may be configured within inlet passage 78, such that fuel flow to filter element inlet 80 is directed through the filter media of first filter element 50. Outlet passage 84 may be adjacent to outlet 86 and may define a channel connecting filter element outlet 82 and outlet 86. Filter element outlet 82 may be defined by outlet passage 84, which is configured to receive filtered fuel from first filter element 50.

As shown in the exemplary embodiment, it is contemplated that first filter base 48 and second filter base 54 have a substantially similar internal configuration. For example, second filter base 54 may define an inlet 88, an inlet passage 90, a filter element inlet 92, a filter element outlet 94, an outlet passage 96, and an outlet 98. Inlet 88 of second filter base 54 may be configured to receive fuel line 34 (see FIG. 1) and/or may be in flow communication with inlet passage 78 of first filter base 48. Inlet passage 90 may be adjacent to inlet 88 and may define a channel that connects inlet 88 and filter element inlet 92. Filter element inlet 92 may be provided within inlet passage 90, such that fuel flow to filter element inlet 92 is directed through the filter media of second filter element 56. Outlet 98 may be located at proximal end 66 of second filter base 54, remote from inlet 88. Outlet passage 96 may be adjacent to outlet 98 and may define a channel connecting filter element outlet 94 and outlet 98. Filter element outlet 94 may be defined in outlet passage 96, and may be configured to receive filtered fuel from second filter element 56.

In the exemplary embodiment shown in FIG. 3, third filter base 60 may include an inlet 100, an inlet passage 102, a filter element inlet 104, a filter element outlet 106, an outlet passage 108, an outlet 110, and a barrier 112. Barrier 112 may be configured to prevent the flow of fuel from fuel line 34 via inlet passage 78 of first filer base 48, and/or from inlet passage 90 of second filter base 54, from entering the third filter module 58 until the fuel has been filtered by at least one of the filter elements associated with first module 46 and/or second module 52. Inlet 100 may be provided adjacent to outlet 98 of second filter base 54, whereby inlet 100 may be configured to receive fuel flow from outlet 98. Inlet passage 102 may be adjacent to inlet 100 and may define a channel that connects inlet 100 and filter element inlet 104. Filter element inlet 104 may be located within inlet passage 102, such that fuel flow to filter element inlet 104 is directed through the filter media of third filter element 62. Filter element outlet 106 may be configured to receive filtered fuel from the third filter element 62. Outlet 110 may be provided at proximal end 66 of third filter base 60 remote from inlet 100. Outlet passage 108 may be adjacent to outlet 110 and may define a channel that connects filter element outlet 106 and outlet 110.

It is contemplated that filter bases 48, 54, and 60 may be arranged in a linear configuration (i.e., in an end-to-end configuration). Filter bases 48, 54, and 60 may include complimentary protrusions 113 and recesses 115 to aid in alignment. It is further contemplated that filter bases 48, 54, and 60 may include vent openings 114, and a vent passage 116, to aid in the venting of vapor from filter elements 50, 56, and 62.

Pumping arrangement 24 may direct one or more pressurized streams of fuel into first filter base 48, and/or second filter base 54, via inlet 76 and/or inlet 88. Inlet passage 78 and inlet passage 90 may be configured to direct fuel received from inlets 76 and 88, to filter element inlets 80 and 92, respectively, along arrow A. Filter element inlets 80 and 92 direct fuel flow to first filter element 50 and second filter element 56, respectively. Fuel may then flow through first filter element 50 or second filter element 56, which capture particulate matter in the fuel (e.g., particulate matter not captured via primary filter assembly 38). After passing through first filter element 50 or second filter element 56, fuel is directed to filter element outlets 82 and 94, where outlet passages 84 and 96 direct fuel out of the first and second filter bases 48 and 54 via outlets 86 and 98, along arrow B.

First filter base 48 and/or second filter base 54 may then direct a pressurized stream of fuel into third filter base 60 via inlet 100. Inlet passage 102 may direct fuel received from outlet 86 and 98 to filter element inlet 104, along arrow C, where filter element inlet 104 directs fuel flow to third filter element 62. The fuel may then flow through third filter element 62, which captures particulate matter in the fuel (e.g., particulate matter not captured via primary filter assembly 38 and/or first filter element 50 and/or second filter element 56). After passing through third filter element 62, fuel is directed to filter element outlet 106, where outlet passage 108 directs fuel to outlet 110, along arrow D.

Industrial Applicability

The fuel filter assembly of the present disclosure may be applicable to a variety of power systems, such as, for example, compression-ignition engines, gasoline engines, gaseous-fuel-powered engines, and other internal combustion engines known in the art, where the reduction of exhaust emissions and/or improved fuel efficiency, among other things, may be desired. By virtue of using the disclosed fuel filter assembly in association with a power system, more precise control of fuel delivery may be achieved, thereby reducing exhaust emissions and/or increasing fuel efficiency. Operation of exemplary power systems provided with an exemplary fuel filter assembly will now be explained.

Referring to FIG. 1, a supply of fuel is drawn from tank 22 via pumping arrangement 24. In the disclosed example, low pressure pump 30 and the high pressure pump 32 are disposed in series and are fluidly connected by way of fuel line 34. Low pressure pump 30 may include a transfer pump that provides a supply of fuel at relatively low pressure to high pressure pump 32. High pressure pump 32 may receive the low pressure fuel and further increase the pressure of the fuel. One or more filtering assemblies, such as primary filter assembly 38 and secondary filter assembly 40, may be disposed along fuel line 34 and may serve to remove undesirable fluid and/or particulate matter from the fuel. Fuel is drawn through fuel filter assembly 38 via high pressure pump 32 and/or low pressure pump 30, where filter media removes fluid (e.g., water) and relatively large particulate matter from the fuel.

After flowing through primary filter assembly 38, the fuel enters secondary filter assembly 40, where the fuel undergoes additional filtration to remove particulate matter (e.g., relatively smaller particulate matter) that was not removed via primary filter assembly 38. Referring to FIG. 3, the fuel is received at inlet 76 and is directed through inlet passage 78 to filter element inlets 80 or 92. Thereafter, filter element inlets 80 and 92 direct fuel flow to filter elements 50 and 56, respectively. Fuel then flows through the filter elements 50 or 56, which capture particulate matter in the fuel, providing a first filtration of particulate matter within secondary filter assembly 40. The fuel is then directed to filter element outlets 82 or 94, where outlet passages 84 and 96 direct the fuel flow out of the filter bases 48 and 54 via outlets 86 and 98, respectively.

Fuel is then directed into third filter base 60 via inlet 100, where the fuel undergoes an additional filtration. The filtered fuel received from filter bases 48 and 54 is directed via inlet passage 102 to filter element inlet 104, where filter element inlet 104 directs fuel flow through third filter element 62. The fuel flows through the third filter element 62, which captures particulate matter in the fuel that was not captured via primary filter assembly 38 and/or first filter element 50 and/or second filter element 56. The filtered fuel is then directed to filter element outlet 106, where outlet passage 108 directs fuel to outlet 110 and out of secondary filter assembly 40. The filtered fuel then flows to flow path 28 (e.g., a fuel rail) via fuel line 36 and high pressure pump 32. The filtered fuel may then be supplied to combustion chambers 16 via fuel injectors 26, and the filtered fuel, along with air, may be ignited, thereby producing mechanical work.

The disclosed fuel filter assembly may ensure more complete removal of particulate matter and/or non-fuel fluids from fuel and may provide relatively compact packaging for use in machine environments having relatively limited space. Specifically, directing fuel flow through multiple filter elements arranged in series by modifying the internal configuration of the filter base may result in enhanced fuel filtration without requiring additional space. In embodiments where only the internal structure of the bases is modified, it may not be apparent to an end user that the bases have been modified. This may reduce the likelihood that maintenance personnel prioritize filter element service based on perceived exposure to debris (i.e., that they may neglect regular maintenance on the filter element associated with the second base). Thus, the disclosed fuel filter assembly may increase the likelihood that the end user performs regular filter element service, regardless of the actual debris exposure of each filter element. Utilized in conjunction with a primary fuel filter assembly, fuel passing through the disclosed filter assembly may be filtered at least three times prior to entering injectors.

It will be apparent to those skilled in the art that various modifications and variations can be made to the disclosed, exemplary power system and/or fuel filter assemblies. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A manifold for a filter assembly, the manifold comprising:
 a first base defining
  a first inlet configured to direct fuel flow to a first filter element,
  a first outlet configured to direct fuel flow from the first filter element to a second filter element, and
  a coupling configured to receive the first filter element;
 a second base operably coupled to the first base, the second base defining
  a barrier configured to prevent the fuel flow from flowing from the first inlet to the second filter element without passing through the first filter element,
  a second inlet configured to receive fuel flow from the first outlet and to direct the fuel flow to the second filter element via a passage formed by the second base, wherein the passage terminates at a location internal to the second base,
  a second outlet configured to receive the fuel flow from the second filter element, and
  a coupling configured to receive the second filter element; and
 a vent passage configured to permit flow of vapor between the first base and the second base.

2. The manifold of claim 1, wherein the first base and the second base define at least one of protrusions and recesses configured to align the first base and the second base when operably coupled to one another.

3. The manifold of claim 1, wherein at least one of the first base and the second base includes at least one flange configured to operably couple the first base and the second base to one another.

4. The manifold of claim 1, wherein at least one of the first base and the second base includes a boss configured to operably couple the manifold in operational relation to an engine.

5. The manifold of claim 1, wherein at least one of the first base and the second base defines a vent opening configured to permit flow of vapor from at least one of the first base and the second base to the vent passage.

6. The manifold of claim 1, further including a third base operably coupled to the first base,
 the third base defining
  a third inlet configured to direct fuel flow to at least one of a third filter element and the first filter element,
  a third outlet configured to direct fuel flow from the third filter element to at least one of the first base and the second base, and
  a coupling configured to receive the third filter element.

7. A filter assembly comprising:
 a first filter element configured to filter fuel;
 a second filter element configured to filter fuel; and
 a manifold configured to direct fuel to the first and the second filter elements,
 the manifold including
  a first base defining
   a first inlet configured to direct fuel flow to at least one of the first filter element,
   a first outlet configured to direct fuel flow from the first filter element to the second filter element,
   a coupling receiving the first filter element, and
  a second base operably coupled to the first base, the second base defining
   a barrier configured to prevent the fuel flow from flowing from the first inlet to the second filter element without passing through the first filter element,
   a second inlet configured to receive fuel flow from the first outlet and to direct the fuel flow to the second filter element via a passage formed by the second base, wherein the passage terminates at a location internal to the second base,
a second outlet configured to receive the fuel flow from the second filter element, and
a coupling receiving the second filter element; and
a vent passage configured to permit flow of vapor between the first base and the second base.

8. The filter assembly of claim 7, wherein the first filter element is configured to remove particulate matter having a first size greater than a first size dimension, and the second filter element is configured to remove particulate matter having a second size greater than a second size dimension, and
wherein the first size dimension and the second size dimension are about equal.

9. The filter assembly of claim 7, wherein at least one of the first filter element and the second filter element includes a spin-on type fuel filter.

10. The filter assembly of claim 7, wherein the first base and the second base define at least one of protrusions and recesses configured to align the first base and the second base when operably coupled to one another.

11. The filter assembly of claim 7, wherein at least one of the first base and the second base includes at least one flange configured to operably couple the first base and the second base to one another.

12. The filter assembly of claim 7, wherein at least one of the first base and the second base includes a boss configured to operably couple the manifold in operational relation to an engine.

13. The filter assembly of claim 7, wherein at least one of the first base and the second base defines a vent opening configured to permit flow of vapor from at least one of the first filter element and the second filter element to the vent passage.

14. The filter assembly of claim 7, further including a third base operably coupled to the first base,
the third base defining
a third inlet configured to direct fuel flow to at least one of a third filter element and the first filter element,
a third outlet configured to direct fuel flow from the third filter element to at least one of the first base and the second base, and
a coupling configured to receive the third filter element.

15. A fuel system comprising:
a tank configured to contain a supply of fuel;
a low pressure pump configured to route the supply of fuel to a high pressure pump;
a high pressure pump configured to raise the pressure of the supply of fuel;
a primary fuel filter assembly including
a primary filter element configured to remove at least one of undesired fluid and particulate matter from the supply of fuel; and
a secondary fuel filter assembly comprising
a first filter element configured to filter fuel;
a second filter element configured to filter fuel; and
a manifold configured to direct fuel to the first and the second filter elements, the manifold including
a first base defining
a first inlet configured to direct fuel flow to the first filter element,
a first outlet configured to direct fuel flow from the first filter element to the second filter element,
a coupling receiving the first filter element, and
a second base operably coupled to the first base, the second base defining
a barrier configured to prevent the fuel flow from flowing from the first inlet to the second filter element without passing through the first filter element,
a second inlet configured to receive fuel flow from the first outlet and to direct the fuel flow to the second filter element via a passage formed by the second base, wherein the passage terminates at a location internal to the second base,
a second outlet configured to receive the fuel flow from the second filter element, and
a coupling receiving the second filter element; and
a vent passage configured to permit flow of vapor between the first base and the second base.

16. The fuel system of claim 15, wherein the first base and the second base define at least one of protrusions and recesses configured to align the first base and the second base when operably coupled to one another.

17. The fuel system of claim 15, wherein at least one of the first base and the second base includes at least one flange configured to operably couple the first base and the second base to one another.

18. The fuel system of claim 15, wherein at least one of the first base and the second base includes a boss configured to operably couple the manifold in operational relation to an engine.

19. The fuel system of claim 15, wherein at least one of the first base and the second base defines a vent opening configured to permit flow of vapor from at least one of the first filter element and the second filter element to the vent passage.

20. The fuel system of claim 15, further including a third base operably coupled to the first base,
the third base defining
a third inlet configured to direct fuel flow to at least one of a third filter element and the first filter element,
a third outlet configured to direct fuel flow from the third filter element to at least one of the first base and the second base, and
a coupling configured to receive the third filter element.

21. The manifold of claim 1, wherein the second outlet receives the fuel flow from the second filter element via an additional passage terminating at an additional location internal to the second base.

22. The manifold of claim 1, wherein the passage terminates at an inlet of the second filter element.

* * * * *